United States Patent [19]
Ueda

[11] 4,037,235
[45] July 19, 1977

[54] EXPOSURE INDICATING DEVICE FOR USE IN MULTIPLE EXPOSURE CONTROL CAMERAS

[75] Inventor: Hiroshi Ueda, Nara, Japan

[73] Assignee: Minolta Camera Kabushiki Kaisha, Osaka, Japan

[21] Appl. No.: 636,963

[22] Filed: Dec. 2, 1975

[30] Foreign Application Priority Data

Dec. 4, 1974 Japan ............................ 49-138508

[51] Int. Cl.² ..................... G03B 7/08; G03B 17/20
[52] U.S. Cl. ................................ 354/38; 354/53; 354/55; 354/57; 354/60 E; 354/60 L; 354/289
[58] Field of Search .............. 354/23 R, 24, 26, 27, 354/28, 29, 30, 36, 37, 38, 39, 53, 54, 55, 56, 57, 60 E, 60 L, 289

[56] References Cited

U.S. PATENT DOCUMENTS

| | | | |
|---|---|---|---|
| 3,578,765 | 5/1971 | Kobayashi et al. | 354/27 |
| 3,611,893 | 10/1971 | Starp | 354/60 E |
| 3,886,568 | 5/1975 | Yazaki et al. | 354/27 |
| 3,950,767 | 4/1976 | Matsui | 354/60 L |

*Primary Examiner*—Russell E. Adams
*Attorney, Agent, or Firm*—Watson, Cole, Grindle & Watson

[57] ABSTRACT

An exposure indicating device for use in a multiple exposure control camera is capable of indicating the diaphragm aperture value and the shutter speed which are to be effected, respectively. With the diaphragm aperture value manually set, and with the shutter speed automatically controlled, the shutter speed to be effected by a control circuit is indicated by a meter pointer and a shutter speed scale member. With the shutter speed manually selected and the diaphragm aperture value automatically controlled, an aperture value indicating member includes an indicating portion and is movable relative to the shutter-speed scale member to indicate the manually set shutter speed indicating portion, and the diaphragm aperture value to be automatically controlled is indicated by a meter pointer on the aperture value indicating member.

11 Claims, 7 Drawing Figures

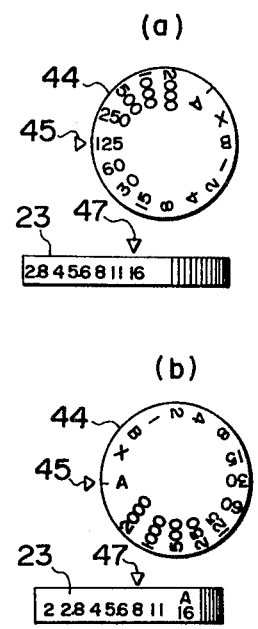
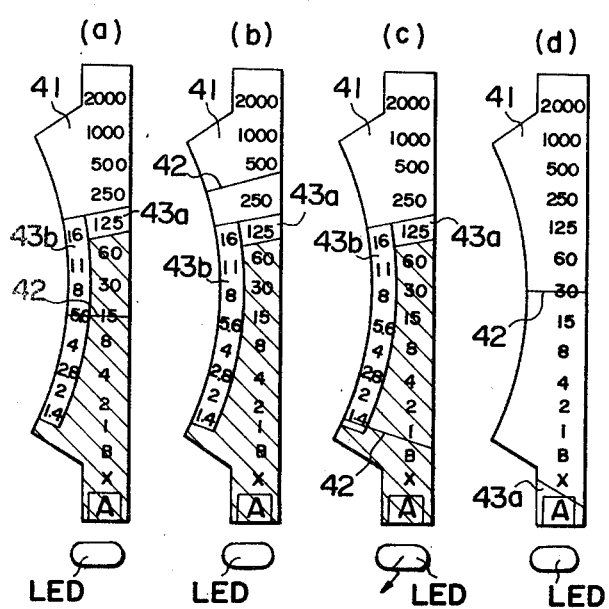
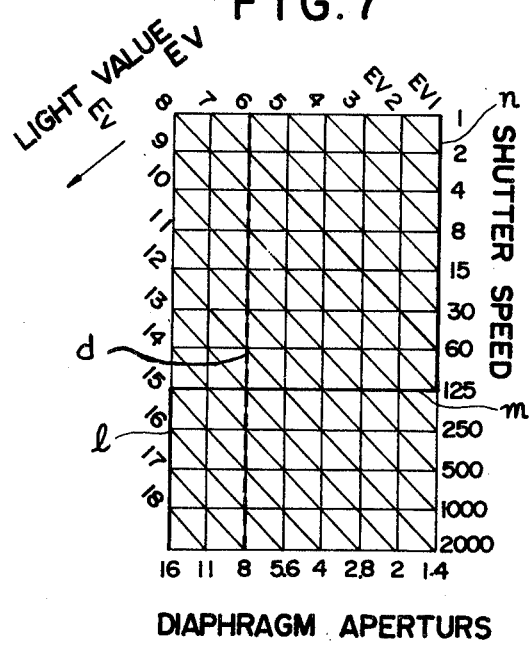

EXPOSURE INDICATING DEVICE FOR USE IN MULTIPLE EXPOSURE CONTROL CAMERAS

BACKGROUND OF THE INVENTION

This invention relates to a multiple exposure control camera for automatically controlling either the aperture value or the shutter speed as desired, in response to scene brightness, and more particularly to an exposure indicating device which is capable of indicating the exposure factor value which is to be automatically controlled.

Prior art multiple exposure control cameras, for example, as disclosed in U.S. Pat. Nos. 3,593,629 or 3,829,867, have disadvantages such as complicated construction of the exposure indicating mechanism for indicating the diaphragm aperture value to be controlled in response to scene brightness with the preferential selection of shutter speed, or alternatively the exposure indicting mechanism for indicating the shutter speed to be controlled in response to scene brightness, with the diaphragm value preferentially selected is also complex. Furthermore, in the case where the shutter speed is preferentially selected, in the event that the scene brightness is too bright to provide the proper diaphragm aperture value to be controlled, then the diaphragm must be stopped-down to a minimum aperture value and the shutter speed has to be controlled to a higher value than the preset shutter speed. Similarly, where the shutter speed is preferentially selected and the scene brightness is too dark, the diaphragm aperture should be maintained in its fully open position and the shutter speed controlled to a lower value than the preset shutter speed. In such cameras, if the controlled shutter speed is too low, the objective may be blurred when the picture is taken by hand-holding the camera, so that it is necessary to provide means for giving a warning that the selected shutter speed will cause a blur. Such means, however, makes the construction of an exposure indicating device more complicated.

SUMMARY OF THE INVENTION

The present invention provides an exposure indicating device for use in a multiple exposure control camera which is arranged as follows. With automatic control of the shutter speed, the proper shutter speed to be effected is indicated by the cooperation of a meter pointer and a shutter speed scale member. With automatic control of the diaphragm aperture, there is provided means for indicating the preferentially selected shutter speed in cooperation with the shutter speed scale member. Additionally, there is provided means for indicating the diaphragm aperture value to be effected in accordance with the position of the meter pointer. The means for indicating the selected shutter speed and the diaphragm aperture value are both movable with respect to the shutter speed scale member, whereby the desired exposure factors for the multiple exposure control camera are indicated by the shutter speed scale member, diaphragm aperture indicating means and meter pointer.

According to a preferred embodiment of the present invention, the multiple exposure control camera comprises the following components. A diaphragm device is adapted to stop-down the diaphragm from its fully open position to a closed position prior to the commencement of exposure, in association with the releasing operation. Diaphragm adjusting means are adapted to stop the diaphragm device at a preset aperture value. A light measuring circuit measures the brightness of light being introduced through the diaphragm aperture and film speed setting means produce electrical signals commensurate with the film speed setting. Shutter speed selecting means include means for indicating the shutter speed to be automatically effected. Computation means effect electrical computation corresponding to the photographic computation to obtain the time value from the scene brightness value, aperture value and shutter speed value, according to the output from the light measuring circuit and film speed representative signals, thereby providing shutter speed control signals. An output circuit produces an output according to the value from the shutter speed selecting means. A diaphragm controlling circuit compares the shutter speed controlling signals with the output signals to produce an output for interrupting the operation of the stopping-down means, when a predetermined relationship between the shutter speed controlling signals and the output signals is achieved. A shutter speed controlling circuit receives input signals commensurate with the shutter speed control signals, and is actuated simultaneously with the commencement of exposure, thereby controlling the termination of exposure by the shutter mechanism. Means are provided for switching the camera operation from the diaphragm controlling circuit to the shutter speed controlling circuit and vice versa.

Impressed on the meter of the exposure indicating device is an input consisting of the aforesaid shutter speed control signal reduced by the signal corresponding to the aperture setting, covering the range from the fully open aperture value to the preset aperture value, so that the meter pointer may be deflected in cooperation with the diaphragm presetting ring. The pointer indicates the proper shutter speed, commensurate with scene brightness at the preset diaphragm aperture value, on the shutter speed scale member.

A plate movable relative to the shutter speed scale member is adapted to be rotated about the center of rotation of the meter pointer, and is interconnected with a shutter speed selecting member, so that the shutter speed indicating portion thereof indicates the selected shutter speed on the shutter speed scale member. The proper aperture value to be automatically effected for the scene brightness at the preset shutter speed is indicated by cooperation of the meter pointer and the aperture value indicating scales provided on the movable plate and the meter pointer. If the pointer goes beyond the range of the scale provided on the movable plate, it indicates that the proper aperture value commensurate with the scene brightness cannot be obtained at the selected shutter speed.

In such circumstances, the shutter is controlled at a shutter speed different from the selected shutter speed. Specifically, when the pointer goes beyond the range of the scale to a minimum aperture value, the shutter speed control is set to an increased shutter speed, commensurate with the aforesaid overshoot or exceeded portion of the scale. Contrary thereto, when the pointer goes beyond the range of the scale to a fully open aperture, then the shutter speed control is set to a decreased shutter speed, commensurate with the aforesaid overshoot of the scale. In the former case, there is no problem because the shutter speed is higher than the selected shutter speed, while in the latter case, the shutter speed is lower than the selected shutter speed, resulting in a possible blurring of the image when a picture is taken by a hand-held camera. To prevent such blurring, there is provided in the exposure indicating device of the present invention a luminous diode which is actuated by the diaphragm controlling circuit output, so as to provide the camera user a warning that the shutter speed is too low for picture taking with a hand-held camera.

According to the present invention, the movable plate, on which a series of aperture value graduations are provided, is shifted according to the selected shutter speed, and an output commensurate with the preset aperture value is obtained by electrically measuring the aperture value, and actuating the meter. Thus, there is obtained a simple construction of the exposure indicating device.

It is accordingly an object of the present invention to provide an exposure indicating device for use in a multiple exposure control camera which is less complex than prior art exposure indicating devices.

It is another object of the present invention to provide an exposure indicating device for use in a multiple exposure control camera, wherein with the diaphragm aperture value automatically controlled and with the shutter speed preferentially selected, in the event that the scene brightness is too dark to provide proper exposure for the preset shutter speed even if the diaphragm aperture is maintained in the fully open position, the shutter speed is controlled to a lower value than the preset shutter speed, with the diaphragm maintained in the fully open position. The shutter speed to be effected and the selected shutter speed are both indicated by the simple construction of the indicating device of the present invention.

It is a further object of the present invention to provide an exposure indicating device for use in a multiple exposure control camera, which is capable of accurately and simply indicating the exposure factors to be effected by using a single meter and the pointer thereof.

The above and other objects of the present invention will be apparent from the ensuing specification in conjunction with the drawings which indicate a preferred embodiment of the present invention.

BRIEF DESCRIPTION OF THE DRAWINGS

FIG. 5 shows various exemplary modes of exposure control in the exposure indicating device shown in FIG. 3, wherein FIG. 5(a) shows the case where the shutter speed is preferentially selected, with the diaphragm aperture being automatically controlled, and FIG. 5(b) shows the case where the diaphragm aperture is preferentially selected, with the shutter speed automatically controlled;

FIG. 6 illustrates the various indicating modes for the exposure factors of the exposure indicating device of FIG. 3, wherein FIG. 6(a) shows the case where the diaphragm aperture is automatically controlled to a proper value, with the shutter speed preferentially selected, FIG. 6(b) shows the case where the diaphragm aperture is stopped down to a minimum aperture value and the shutter speed is controlled to a value higher than the selected shutter speed, because the scene brightness is too bright to provide a proper aperture value for the selected shutter speed, FIG. 6(c) shows the case where the diaphragm is brought into a fully open position and the shutter speed is controlled to a value lower than the selected shutter speed, because the scene brightness is too dark to provide a proper aperture value for the selected shutter speed, and FIG. 6(d) shows the case where the aperture value is manually set and the shutter speed is automatically controlled;

FIG. 7 shows the modes for automatically determining both the aperture value and the shutter speed, or the shutter speed alone, in accordance with the selected shutter speed or the preset aperture value, in the multiple exposure control camera shown in FIG. 2.

DESCRIPTION OF THE PRIOR ART

Figure 1:
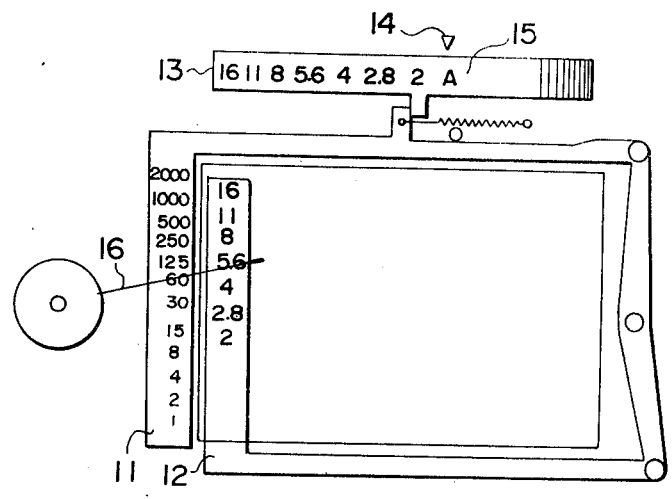
FIG. 1 is a front view of a known exposure indicating device for a multiple exposure control camera.

FIG. 1 shows by way of example a known exposure indicating device for a multiple exposure control camera. The known exposure indicating device is so arranged that, in order to indicate the proper exposure, respectively for the case where the shutter speed is automatically controlled and for the case where the aperture value is automatically controlled, shutter speed indicating scale band 11 and aperture value indicating scale band 12 are moved relative to meter pointer 16 in association with the movement of diaphragm aperture setting ring 13, depending on the selected mode of exposure control. When mark A on diaphragm setting ring 13 is registered with fixed indicia 14 for setting the automatic diaphragm control mode, aperture value indicating scale 12 appears in the field of the camera view finder. When any one of the other diaphragm graduations is registered with fixed indicia 14 for manual diaphragm setting, then shutter speed indicating scale 11 appears in the field of the view finder. However, the known exposure indicating device requires a complicated mechanism for shifting the indicating device upon changing-over the exposure control modes from one to another. Moreover, the known device fails to provide the proper exposure for a preferential shutter speed, so that if the shutter speed is to be controlled to a value different from the selected shutter speed, neither the shutter speed to be effected nor the preferentially selected shutter speed is indicated.

DETAILED DESCRIPTION OF THE INVENTION

Figure 2:
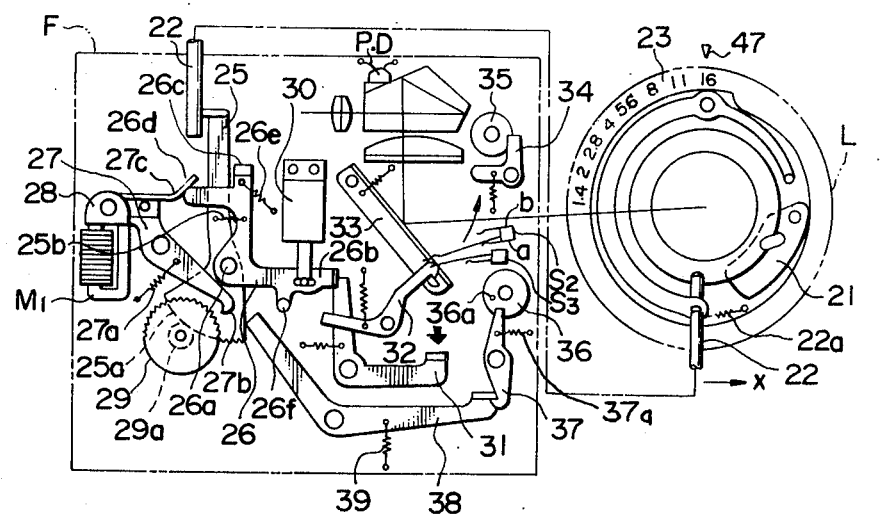
FIG. 2 illustrates a preferred embodiment of a multiple exposure control camera, wherein the essential part of the body proper of the camera is shown in a longitudinal cross-sectional side view and the essential part of the lens barrel is shown in a front view.
Figure 3:
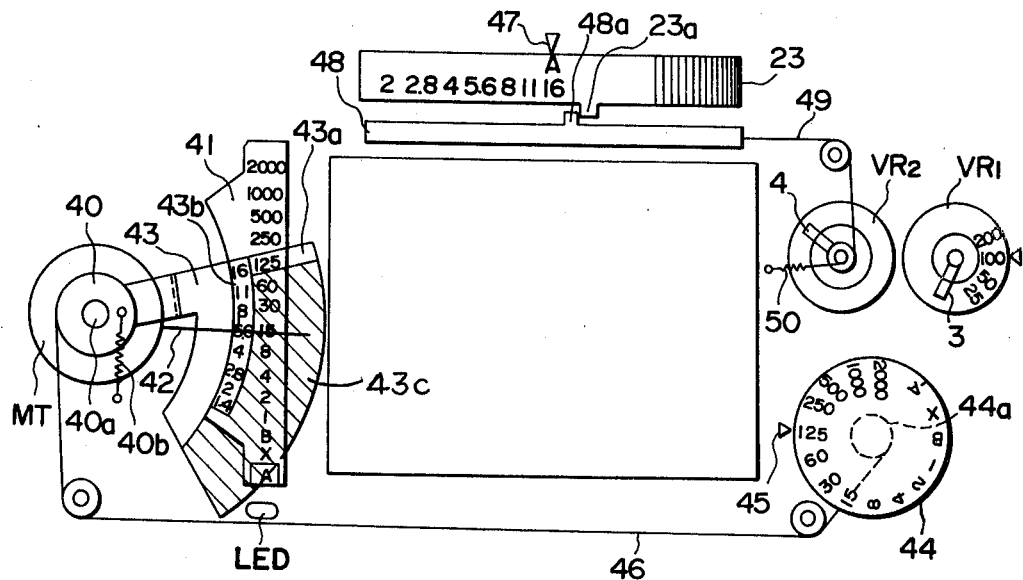
FIG. 3 is a front view of an exposure indicating device incorporated in the camera of FIG. 2.
Figure 4:
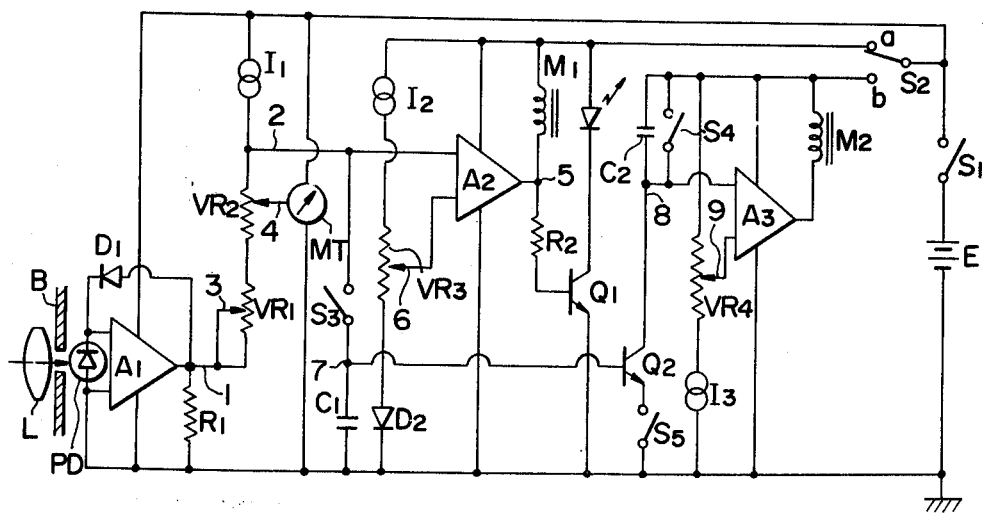
FIG. 4 is a diagram of an exposure controlling circuit incorporated in the camera of FIG. 2.

The following is a detailed description of the preferred embodiments shown in FIGS. 2 through 7. Referring first to FIG. 4, which illustrates an automatic exposure control circuit employed in the embodiment of the invention, photodiode PD receives light being introduced from the photographic object through objective lens L and diaphragm aperture B. Because the light passes through the diaphragm aperture, the light is expressed as being Bv-Av according to the APEX system, wherein Bv is representative of a luminance value and Av is an aperture value. The voltage across the terminals of photodiode PD is input to differential amplifying circuit A1. Logarithmic compression diode D1 is connected between output terminal 1 of differential amplifying circuit A1 and one terminal of photodiode PD, thus constituting a negative feedback circuit. Connected between output terminal 1 of circuit A1 and the other terminal of photodiode PD is output resistor R1. The above mentioned elements constitute a light measuring circuit. Due to the operation of differential amplifying circuit A1, the voltage across the terminal of photodiode PD is maintained substantially at a zero voltage, while the photocurrent of photodiode PD flows through resistor R1, and the photocurrent has high proportional precision for the incident light which does not include a dark current. As a result, voltages proportional to the logarithmic value of the incident light appear at the terminals of diode D1, according to the aforesaid photocurrent.

A series circuit consisting of constant current source $I_1$ and potentiometers VR1 and VR2, which are connected in series to each other, constitutes a level shifting circuit, so that the voltage across terminals 2 and 3 is added to the voltage across resistor R1, and thus the sum of both voltages will appear at terminal 2 as a shutter speed controlling signal voltage.

Potentiometers VR1 and VR2 each have a linear resistance characteristic such that the voltage at the respective sliding elements is directly proportional to the movement thereof with the constant current of current source $I_1$. Sliding element 3 of potentiometer VR1 is adapted to move according to the set value of the film sensitivity (a speed value Sv according to the APEX system). Sliding element 4 of potentiometer VR2 is interconnected with a diaphragm aperture presenting ring and adapted to move according to the range of scales (Av-Avo, wherein Avo is representative of an APEX number corresponding to a fully open aperture value), through which the diaphragm aperture presetting ring is rotated to stop down the diaphragm from its fully open position to a preset aperture value. When the preset aperture value coincides with the fully open aperture value, the voltage at sliding element 4 becomes equal to that of terminal 2.

The voltage produced at sliding element 4 is input to meter MT. Meter MT operates such that when the aperture value is preset, with the shutter speed automatically controlled (hereinafter referred to as shutter-auto), then meter MT indicates the proper shutter speed (a time value TV according to the APEX system) which is commensurate with the preset aperture value. And in case the shutter speed is pre-selected, with the aperture value automatically controlled (hereinafter referred to as aperture-auto), then meter MT indicates the proper aperture value commensurate with the shutter speed to be selected by a mechanism described hereinafter. If the scene brightness is too bright to provide a proper exposure for the selected shutter speed even if the diaphragm is stopped down to a minimum aperture, then meter MT indicates the proper shutter speed to be effected by correcting the selected shutter speed.

Differential amplifying circuit A2 acts as a switcing circuit to output terminal 5, to which is connected electromagnet M1 for interrupting the stopping down operation of the diaphragm and for locking the same. A circuit consisting of constat current source $I_2$, potentiometer VR3 and diode D2, which are connected in series to one another, operates to provide a switching level to switching differential amplifying circuit A2. Sliding element 6 of potentiometer VR3 is designed so as to move in association with the selection of the shutter speed in the aperture-auto mode. Potentiometer VR3 therefore should have a linear resistance characteristic, and diode D2 compensates for the temperature characteristic variation of diode D1.

Resistor R2 is connected to output terminal 5 of differential amplifying circuit A2, and resistor R2 is connected in series to electromagnet M1, as seen in FIG. 4. The other terminal of resistor R2 is connected to the base of transistor Q1, the collector of which is connected to luminous diode LED. The circuit consisting of resistor R2, transistor Q1 and luminous diode LED provides an indication that, in the aperture-auto mode, the scene brightness is too dark to provide a proper aperture value for the selected shutter speed.

Switch S3, one end of which is connected to terminal 2, is normally maintained closed and adapted to be opened immediately before the movable mirror in a single lens reflex camera is moved in association with the shutter releasing operation. Switch S3 also connects the output voltage from terminal 2 in storage capacitor C1 at this stage. Transistor Q2, having its base connected to one terminal 7 of storage capacitor C1, is an expansion transistor, to the collector of which there is caused to flow a current proportional to the inverse logarithm of the voltage stored by storage capacitor C1, which voltage is to be impressed across the base-emitter of transistor Q2. Capacitor C2, connected to the collector of expansion transistor Q2, integrates the collector current thereof. Switch S4, connected in parallel to integrating capacitor C2, discharges capacitor C2 and is normally maintained closed and adapted to be opened prior to the release of the shutter, in association with the shutter release operation. Switch S5, connected to the emitter of expansion transistor Q2, is a trigger switch which is normally maintained open and adapted to be closed simultaneously with the movement of the shutter to its open position. As a result of the closure of switch S5, the collector current of expansion transistor Q2 is integrated by capacitor C2.

Switching circuit A3 is a differential amplifying circuit and one input terminal is connected to one terminal 8 of integrating capacitor C2, and so arranged as to actuate electromagnet M2 connected to the output terminal of the switching circuit when the integrating capacitor C2 is charged to a given voltage, thereby releasing the shutter rear curtain which has been locked in the closed position.

Potentiometer VR4, connected in series to constant current source $I_3$, and its sliding element 9 form a circuit adapted to provide the aforesaid switching level. Sliding element 9 is connected to the other input terminal of switching circuit A3.

Switch S1 connects potential source E to the circuit, and switch S2 enables changing over the operations of the exposure controlling device from one operational mode to another. Switch S2 is initially connected to contact *a* and so arranged as to be moved from contact *a* to contact *b*, immediately before storage switch S3 is opened after the completion of the aperture value determining operation by electromagnet M1 in association with the shutter releasing operation.

FIG. 2 shows the construction of the essential part of an automatic diaphragm operating mechanism incorporated in the multiple exposure control camera, wherein exchangeable lens L is shown in a front view and body proper F of the camera is shown in a side view.

When exchangeable lens L is mounted in body proper F of the camera, diaphragm actuating pin 22 is brought into engagement with diaphragm controlling lever 25, which is rotatably supported by shaft 26a in camera body F, to actuate diaphragm actuating pin 22 and open diaphragm blades 21 which tend to be stopped-down by spring 22a. As a result, diaphragm actuating pin 22 is biased against the force of spring 22a by diaphragm controlling lever 25 which is maintained cocked prior to the camera release operation, and thus diaphragm blades 21 are maintained in the fully open position.

When it is desired to take a picture in the diaphragm-auto mode, diaphragm presetting ring 23 in exchangeble lens L is rotated so as to set a minimum aperture value (F:16 in the drawing) at indicia 47.

When release lever 31 is urged in the direction of the arrow in FIG. 2, in association with the shutter releasing operation, then actuating lever 26, which has been locked by release lever 31, is released therefrom. Actuating lever 26 is rotatably supported by shaft 26a and is biased to be rotated in the clockwise direction by strong spring 26e. Thus, as soon as actuating lever 26 is unlocked, it starts rotating in the clockwise direction from the cocked position shown in FIG. 2, which rotation is decelerated by damper 30 mounted on lever 26. Since diaphragm controlling lever 25 is coupled by coupling spring 25b to actuating lever 26, then diaphragm controlling lever 25 is also rotated in the clockwise direction together with actuating lever 26, and maintained in engagement with contacting piece 26c of actuating lever 26. Thereby diaphragm actuating pin 22 follows the diaphragm-controlling lever 25 by the force of spring 26a, thereby stopping-down the diaphragm from its fully open position to its closed position.

Gear 29 is fixed to pinion 29a and the teeth thereof mesh with the teeth of member 25a of diaphragm controlling lever 25. The rotation of gear 29 is accelerated as a result of the rotation of diaphragm controlling lever 25.

During the above-described diaphragm-stopping-down operation, light is introduced through photographic lens L and diaphragm aperture B, defined by the diaphragm blades 21, and impinges on photodiode PD of the light measuring circuit as shown in FIG. 4. Accordingly, when the diaphragm has been stopped-down to a proper aperture value for the selected shutter speed and scene brightness, electromagnet M1 is deenergized by the output signal from the light measuring circuit through differential amplifying circuit A2.

Locking lever 27 has at one end armature 28 adapted to be attracted to electromagnet M1 and locking pawl 27b at the other end. Locking lever 27 is supported to be rotated clockwise by spring 27a, whereby armature 28 is drawn apart from electromagnet M1. When electromagnet M1 is deenergized, locking pawl 27b engages the teeth of gear 29 to interrupt the rotation thereof. Consequently, the diaphragm-stopping-down operation of diaphragm controlling lever 25 is interrupted, whereby the diaphragm is set to the proper aperture value.

Even after diaphragm controlling lever 25 has been locked, actuating lever 26 still continues to rotate in the clockwise direction, and arm 26b thereof is eventually brought into engagement with mirror locking lever 32 to rotate it counterclockwise, whereby movable mirror 33 is released from mirror locking lever 32. Prior to the release of movable mirror 33 from mirror locking lever 32, storage switch S3, which has been maintained closed and is biased open, is opened by the rotation of mirror locking lever 32. Prior to the switching of switch S3 to an open position, change-over switch S2 is moved from contact a to contact b.

The released movable mirror 33 is rotated counterclockwise as illustrated by the force of spring 33a, thereby opening discharging switch S4, and then releasing front-curtain-winding shaft 35 of the focal plane shutter from locking lever 34, so that the shutter is actuated. Simultaneously with the movement of the shutter to the open position, trigger switch S5 is closed, and the charging of integrating capacitor C2 is commenced under the control of the voltage stored by storage capacitor C1.

When the integrating capacitor C2 is charged to a given voltage level, the output from switching circuit A3 deenergizes electromagnet M2, whereby rear curtain shaft 36 is released from a locked position by a known mechanism (not shown) and allowed to travel, and thus the shutter is closed. The travel of the rear curtain causes the clockwise rotation of rear-curtain-shaft 36. Immediately before the termination of the rotation of rear-curtain shaft 36, pin 36a thereon rotates locking lever 37 counterclockwise against the force of spring 37a, whereby return lever 38 is released from lever 37. Consequently, return lever 38 is rotated clockwise by the force of strong return-spring 39 and eventually brought into engagement with pin 26f on actuating lever 26, so that actuating lever 26 is rotated counterclockwise against the force of spring 26e. By the counterclockwise rotation of actuating lever 26, projection 26d of lever 26 is brought into engagement with angled projection 27c of locking lever 27, thereby rotating it counterclockwise, whereby locking pawl 27b is retracted from gear 29. Furthermore, the counterclockwise rotation of locking lever 27 causes armature 28 to be brought into contact with electromagnet M1, while contacting piece 26c of actuating lever 26 is brought into engagement with diaphragm controlling lever 25, so that it is rotated counterclockwise to move the diaphragm toward an open position.

The clockwise rotation of return lever 38 causes the rotation of movable mirror 33 into a viewing position shown in FIG. 2 by means of a known member (not shown). At this time, actuating lever 26 is returned to a position in which lever 26 is engageable with release lever 31, and movable mirror 33 is also returned to the position shown in FIG. 2, in which the mirror is engageable with mirror locking lever 32. When the front curtain and rear curtain have been cocked according to the film winding and cocking operation of the camera, then return lever 38 is rotated counterclockwise against the force of return spring 39 and eventually resumes the position shown in FIG. 2 in which return lever 38 is locked by lever 37.

With respect to the operation of the exposure controlling circuit shown in FIG. 4, at the time of exposure, immediately before the movable mirror 33 is moved upwards, light reflected from an object through picture taking lens L and diaphragm aperture B impinges on photodiode PD, so that there is produced at output terminal 1 a light measuring output voltage across resistor R1 commensurate with the scene brightness and the opening of the diaphragm aperture. A voltage commensurate with the film sensitivity is added to the light measuring output voltage by sliding element 3 of potentiometer VR1, to which voltage is further added the voltage across potentiometer VR2. The sum of these voltages is produced at terminal 2 as a shutter speed controlling signal voltage VT, is impressed across the base-emitter of expansion transistor Q2, and thus the shutter speed is controlled according to voltage VT.

After the termination of the diaphragm-stopping-down operation and immediately before movable mirror 33 is released from lever 32, storage switch S3 is opened, and shutter speed controlling signal voltage VT, produced according to the light measured through the stopped-down diaphragm aperture, is stored by storage capacitor C1. Subsequently, discharging switch S4 is opened and trigger switch S5 is closed simultaneously with the shutter opening. By this time, change-over switch S2 has been moved from contact *a* to contact *b*, so that the charging of the expansion transistor Q2 collector current by integrating capacitor C2 is started. Thus, after the lapse of a controlled exposure time the shutter is closed to terminate the exposure. Due to the motion of return lever 38 and the film winding-up operation, switches S3 and S4 are respectively closed, and trigger switch S5 is opened, while change-over switch S2 is moved to contact *a*.

The above-described operation is continuously effected in the camera, so that at the stage in which the release operation has not been effected, the proper shutter speed controlling voltage for a fully open aperture is produced at terminal 2. In contrast thereto, there is produced at sliding element 4 a proper shutter speed signal voltage for the preset aperture value. Therefore, in the shutter-auto mode, the proper shutter speed for the preset aperture value is indicated on meter MT.

In the diaphragm-auto mode, diaphragm presetting ring 23 is preset to the minimum aperture value, and the desired shutter speed is selected, for example by using a shutter speed dial or the like, so that sliding element 6 of potentiometer VR3 is moved in accordance with the selected shutter speed, so that a voltage commensurate therewith is impressed at one input terminal of differential amplifying circuit A2, to determine the switching level thereof. As an example, if the selected shutter speed value is changed from 1/60 second to 1/125 second, the voltage at sliding element 6 will be changed by a given voltage. Also, before the releasing operation is effected, change-over switch S2 is maintained connected to contact *a*. If the voltage at terminal 2 is higher than that at sliding element 6 when the diaphragm is in the fully open position, electromagnet M1 is maintained excited. Thus, if the release button is pushed, the diaphragm stopping-down operation of diaphragm controlling lever 25 is initiated, and the voltage at terminal 2 is gradually lowered in accordance with the extent to which the diaphragm is stopped-down. When the voltage at terminal 2 is equal to that at sliding element 6, then electromagnet M1 is deenergized according to the switching operation of differential amplifying circuit A2, so that the diaphragm-stopping-down operation of diaphragm controlling lever 25 is arrested by locking lever 27, and thus the aperture value is determined.

When the scene brightness is too high, and the voltage at terminal 2 is higher than that at sliding element 6, even with the diaphragm stopped-down to its minimum aperture value, electromagnet M1 is maintained excited until change-over switch S2 is turned from contact *a* to contact *b* through the rotation of mirror locking lever 32 in the course of the shutter releasing operation. The shutter speed is controlled by the light reflected from a photographic object, which enters through the minimum aperture of the diaphragm which has been determined as described above.

When the scene brightness is too low and a proper aperture value for the selected shutter speed is not obtained, the voltage at sliding element 6 is maintained higher than that at terminal 2 with a fully open aperture prior to commencement of the release operation, and the electromagnet M1 is maintained deenergized. Accordingly, transistor Q1 is maintained conducting, whereas luminous diode LED is energized, to thereby indicate that the selected shutter speed is beyond the range of the scale to provide a warning to the camera operator that the shutter speed to be effected under control at the time of exposure is lower than the selected shutter speed.

It is one of the major advantageous features of the present invention to provide structure for indicating the above-described warning by the use of meter MT in a camera capable of effecting the above-described exposure control.

FIGS. 3, 5 and 6 show an embodiment of an exposure factor indicator which appears within the view finder of the camera. Shutter speed scale plate 41 is fixed to the camera body, and on the surface of plate 41 are provided a series of shutter speed graduations within the range of the deflection angles of pointer 42 of meter MT. On the surface of shutter speed dial 44 (secured to the camera body), there are provided shutter speed graduations including mark A indicating the shutter-auto mode, as seen in FIG. 5. The shutter speed is selected by turning shutter speed dial 44 until one of the graduations of the shutter speed scales is in alignment with indicia 45 marked on the camera body.

With reference to FIG. 3, cord 46 is rigidly wound at one end to pulley 44a, which is coaxial with shutter speed dial 44 and is rotated integrally therewith, and wound at the other end to pulley 40, which in turn is supported by shaft 40a mounted on the rotary shaft of pointer 42 of meter MT and biased to take up cord 46 under the action of spring 40b. Rotatable plate 43 is mounted on pulley 40 coaxially and rotatably therewith in a manner to be superposed on shutter speed scale plate 41. When shutter speed dial 44 is rotated, movable plate 43 is rotated relative to meter pointer 42 as well as relative to shutter speed scale plate 41 in association with the rotation of dial plate 44. Rotatable plate 43 has transparent shutter speed indicating portion 43a for indicating the selected shutter speed, aperture value indicating portion 43b, and semi-transparent or colored transparent portion 43c which covers the graduations showing shutter speeds lower than the shutter speed selected.

Meter MT is connected to the indicating circuit as has been referred to in conjunction with FIG. 4, and pointer 42 indicates the proper shutter speed for the aperture value that has been preset with the diaphragm maintained in the fully open position, thus effecting light measurement at the fully open aperture value. Thus, when the camera is used for automatically controlling shutter speed (the shutter-auto mode), follower plate 48 is urged by engagement of projection 48a and projection 23a of the diaphragm presetting ring 23, according to the aperture value aligned with indicia 47 on diaphragm presetting ring 23. Projection 48a is biased into abutment with projection 23a by spring 50. Consequently, sliding element 4 of potentiometer VR2 is caused to move by the movement of cord 49 against the force of spring 50, whereby pointer 42 indicates the shutter speed to be effected under control of shutter speed scale plate 41. However, for for the actual exposure, the shutter speed is controlled according to the light measurement for the preset aperture value, to which the diaphragm has been stopped-down, and the aforesaid value indicated by pointer 42 is an estimated value obtained from the light measurement at the fully open aperture value. However, there is little difference between both values, so that the value indicated by pointer 42 is a reliable shutter speed to be effected under control for the actual exposure. In the shutter-auto mode, mark A on shutter speed dial 44 is aligned with indicia 45. In such a case, shutter speed indicating portion 43a is positioned at mark A on shutter speed scale member 41, while aperture value indicating portion 43b assumes an off-scale position, i.e., none of the shutter speed graduations on shutter speed scale plate 41 appear through colored transparent portion 43a. Assuming that the aperture value preset by presetting ring 23 is f:8, then the result is as shown in FIG. 6(d) and FIG. 5(b). The programming chart for the exposure control for such a case is represented by the dotted line (d) in FIG.7. A proper shutter speed in this case is indicated as 1/30 second, by pointer 42 as seen in FIG. 6(d)

In the shutter-auto mode, if shutter speed dial 44 is rotated to align mark A with indicia 45, it is necessary that change-over switch S2 is connected to contact b, and locking pawl 27b of locking lever 27 shown in FIG. 2 is forcibly retracted from gear 29, so that the mechanism for arresting the diaphragm-stopping down operation may be maintained inoperative. To obtain that object, sliding element 6 and terminal 2 may be so arranged that the voltage at sliding element 6 is usually lower than that at terminal 2. Alternatively, the clockwise rotation of locking lever 27 may be mechanically impeded.

In the aperture-auto mode, if shutter speed dial 44 is rotated to align that graduation indicating a desired shutter speed with indica 45, then the preset shutter speed value on shutter speed scale member 41 will be visible through shutter speed indicating portion 43a of rotatable plate 43. FIG. 3 and FIGS. 6(a), (b) and (c) all show instances where the selected shutter speed is 1/125 second, respectively.

In the aperture-auto mode, diaphragm presetting ring 23 is usually set to a minimum aperture value (f:16 in the drawing), and the pointer 42 indicates the proper shutter speed for the minimum aperture value (f:16).

Assume that pointer 42 indicates 1/15 second as shown in FIG. 6(a). The selected shutter speed is 1/125 second, and therefore there are three graduations between both of the aforementioned shutter speed values. According to the APEX system of expression, the proper exposure condition is represented by the following equation:

$$(AV - AVO) + TV = (BV - AVO) + SV$$

The example of FIG. 6(a) shows that in terms of the aperture value being f:16, proper exposure is effected by controlling the shutter speed at 1/15 second, which is three graduations removed from the preset shutter speed of 1/125 second. Stated otherwise, in terms of the shutter speed being 1/125 second, the aperture value for a proper exposure is f:5.6 which is three graduations removed from f:16.

The aperture value indicating portion 43b provided on rotatable plate 43 consists of a series of graduations which are provided in positions corresponding to the shutter speed representing scales provided on plate 41, with the minimum aperture value of f:16 aligned with the shutter speed indicating portion 43a. The graduations of aperture values are marked at distances substantially equal to the spacing between the graduations on the shutter speed scale. In the case of the aperture-auto mode, only the selected shutter speed appears in view through the shutter speed indicating portion 43a. Stated otherwise, the aforesaid graduations of aperture values appear on the shutter speed scale member 41 in corresponding relation to the shutter speed scale.

The above relationships are described in more detail with reference to FIG. 6a. Pointer 42 indicates an aperture value of f:5.6, which is three graduations removed from the minimum aperture value of f:16, and the aperture value of f:5.6 is in alignment with the shutter speed value of 1/15 second, which is three graduations removed from the preset shutter speed of 1/125 second. From the indication of pointer 42, the proper aperture value for the preset shutter speed of 1/125 second is read as f:5.6. The value of f:5.6 is the aperture value to be controlled.

FIG. 6b shows the case where the scene brightness is too high for the selected shutter speed, and hence it is impossible to control exposure at the proper aperture value. In this example, pointer 42 indicates the shutter speed value of 1/500 second which is higher than the preset shutter speed value of 1/125 second. From the above conditions, it is apparent that the exposure will be effected at the shutter speed of 1/500 second and at the minimum aperture value of f:16.

The case where scene brightness is too low to adjust the aperture value to the proper value for the selected shutter speed is shown in FIG. 6c. In such a case, the luminous diode LED is lit and the exposure is effected at the adjusted shutter speed to a lower value than the preset shutter speed of 1/125 second.

Assuming that the preset shutter speed is 1/125 second, then the programming chart for the scene brightness is represented by solid lines l, m and n in FIG. 7. Line l represents the case where the scene brightness is too high, line m represents the case where the aperture value is controlled to the proper value, and line n represents the case where scene brightness is too low. The positional relationship of pointer 42 to the shutter speed indicating portion 43a as well as the lighting of luminous diode LED may warn of the aforesaid conditions. It is generally accepted that the shutter speed value of 1/30 second is a critical value at, or above, which the photographic image of an object may be blurred when the picture is taken by a hand-held camera. If the scene brightness is so dark that luminous diode LED is lit even with a selected shutter speed of 1/30 second, then the camera user will know that a tripod or a flash lamp has to be used, and as a result a blur-free picture may be taken.

What is claimed is:

1. An exposure indicating device for a camera of the type having a multiple exposure control system for automatically controlling shutter speed in accordance with scene brightness measured through a manually or automatically adjusted diaphragm aperture adapted to be adjusted from a fully closed setting to a fully open setting, said indicating device comprising:
shutter speed setting means settable to an automatic shutter speed control position or to one of a plurality of manually selected positions;
light responsive circuit means for generating a first output representative of scene brightness measured through the diaphragm aperture;
means for setting the film speed value;
adjusting means for adjusting said first output in accordance with said film speed value setting and generating a second output as a result thereof;

diaphragm value presetting means settable to one of a plurality of manually selected positions with the diaphragm aperture fully open;

second adjusting means responsive to the setting of said diaphragm presetting means for generating a third output including said second output;

an indicating means actuated in response to said third output, a first scale member including a shutter speed scale, said indicating means indicating the shutter speed to be effected on said shutter speed scale with the preset diaphragm aperture;

a second scale member movable relative to said first scale member and said indicating means in accordance with the position of said shutter speed setting means and including a first portion for indicating the set shutter speed on said shutter speed scale, said second scale member further including a diaphragm scale, said indicating means also indicating the diaphragm aperture to be automatically determined with said set shutter speed.

2. An exposure indicating device as in claim 1, wherein said indicating means includes a movable element positioned in response to said third output, said movable element indicating the shutter speed to be effected on said shutter speed scale with the preset diaphragm aperture, and the diaphragm aperture on said diaphragm scale to be automatically determined with said set shutter speed.

3. An exposure indicating device as in claim 2, wherein said device further comprises means for generating a fourth output as a function of said set shutter speed, means for comparing said second output with said fourth output, and second indicating means responsive to said means for comparison for providing a visual indication when said fourth output exceeds said second output.

4. An exposure indicating device as in claim 3, wherein said second indicating means includes an electrical element for emitting light and said comparing means includes a differential amplifier responsive to said second and fourth outputs for actuating said electrical element when said fourth output exceeds said third output.

5. An exposure indicating device as in claim 2, wherein said indicating means includes an exposure meter and said movable element is the pointer thereof being deflected in response to said third output.

6. An exposure indicating device as in claim 5, wherein said second scale member is rotatable concentrically with said pointer and said shutter speed scale includes shutter speed graduations arranged in descending order from the highest shutter speed to the lowest shutter speed, said diaphragm scale including aperture setting graduations with said fully closed aperture setting graduation located adjacent said first portion, and the remaining aperture graduations being located in ascending order to said fully open setting, said aperture setting graduations being spaced to be in substantial alignment with said shutter speed graduations with said second scale member overlapping said first scale member, whereby the position of said pointer indicates the differences between said set diaphragm aperture and that diaphragm aperture to be automatically controlled with said set shutter speed, and also the difference between said set shutter speed and the shutter speed to be effected.

7. An exposure indicating device as in claim 6, wherein said second scale member includes a semitransparent portion for covering the slower shutter speeds on said first scale member than the manually selected one indicated by said first portion.

8. An exposure indicating device as in claim 6, wherein said second scale member includes a colored portion for covering the slower shutter speeds on said first scale member than the scale of the portion of the manually selected one indicated by said first portion.

9. An exposure control device as in claim 6, wherein with said diaphragm value presetting means settable to said fully closed aperture setting and said shutter speed setting means set to one of said plurality of manually selected positions, said pointer is positioned to indicate a higher shutter speed on said first scale member than said manually selected shutter speed with the scene brightness such that there is no proper aperture setting for said set shutter speed setting.

10. An exposure indicating device as in claim 6 with said diaphragm value presetting means set to said fully open setting, and said shutter speed setting means set to one of said plurality of manually selected positions, said pointer is positioned to indicate a lower shutter speed setting on said first scale member than said selected shutter speed setting with said scene brightness such that there is no proper aperture setting for said set shutter speed setting.

11. An exposure indicating device as in claim 10, wherein said device further comprises means for generating a fourth output as a function of said set shutter speed, means for comparing said second output with said fourth output and said second indicating means is responsive to said means for comparison for providing a visual indication with said indicated lower shutter equal to or less than 1/30 second.

* * * * *